United States Patent [19]

Svischev et al.

[11] 4,196,585

[45] Apr. 8, 1980

[54] EJECTOR-TYPE ENGINE THRUST AUGMENTOR

[76] Inventors: Georgy P. Svischev, ulitsa Kirova, 40, kv. 26, Moscow; Jury G. Zhulev, ulitsa Chkalova, 22, kv. 33, Zhukovsky Moskovskoi oblasti; Jury F. Potapov, ulitsa Novy proezd, 2a, kv. 18, Zhukovsky Moskovskoi oblasti; Viktor I. Ilin, ulitsa Novy proezd, 4a, kv. 51, Zhukovsky Moskovskoi oblasti; Reamir A. Izmailov, Brest-Litovskoe shosse, 144, kv. 45; Andrei S. Merega, ulitsa Scherbanova, 134, kv. 135, both of Kiev; Valentin F. Spivak, ulitsa Zhukovskogo, 69, Primorsky krai, Arseniev; Viktor M. Chuiko, prospekt Lenina, 21, kv. 59, Zaporozhie; Jury V. Dergachev, ulitsa 8 marta, 64, kv. 9, Zaporozhie; Anatoly G. Dvornikov, ulitsa 8 marta, 66, kv. 2, Zaporozhie, all of U.S.S.R.

[21] Appl. No.: 910,778

[22] Filed: May 30, 1978

Related U.S. Application Data

[63] Continuation of Ser. No. 728,965, Oct. 4, 1976, abandoned.

[51] Int. Cl.$^2$ ................................................ F02K 1/02
[52] U.S. Cl. ..................................... 60/264; 60/269; 239/127.3; 239/265.17
[58] Field of Search ............... 60/264, 269; 239/127.3, 239/265.17

[56] References Cited

U.S. PATENT DOCUMENTS

| | | | |
|---|---|---|---|
| 2,914,916 | 12/1959 | Gelin et al. | 239/265.17 |
| 3,143,293 | 8/1964 | Purse | 60/264 |
| 3,550,721 | 12/1970 | Bruner | 239/127.3 |
| 3,592,291 | 7/1971 | Medawar | 239/265.17 |

FOREIGN PATENT DOCUMENTS 865838   4/1961   United Kingdom ............... 239/265.17

*Primary Examiner*—Robert E. Garrett
*Attorney, Agent, or Firm*—Robert E. Burns; Emmanuel J. Lobato; Bruce L. Adams

[57] ABSTRACT

An ejector-type engine thrust augmentor intended for use in aircraft, e.g. in agricultural aviation. The thrust augmentor comprises an ejector shroud and a shell in the form of a truncated cone. The shell is located between the nozzle and the ejector shroud. The large-diameter inlet section of the shell faces the outlet section of the nozzle whereas the small-diameter outlet section of said shell faces the inlet section of the ejector shroud. The shell has longitudinal slots spaced at equal distances from one another. Due to the efflux of air from the longitudinal slots the stream flowing out of the nozzle acquires a complex cross section with a large surface area. This increases considerably the thrust increment with substantially smaller size and weight of the thrust augmentor.

5 Claims, 10 Drawing Figures

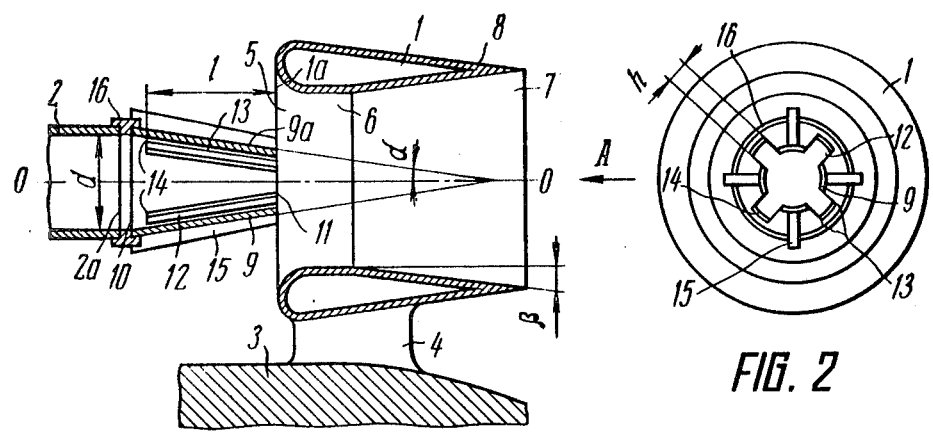
FIG. 1
FIG. 2
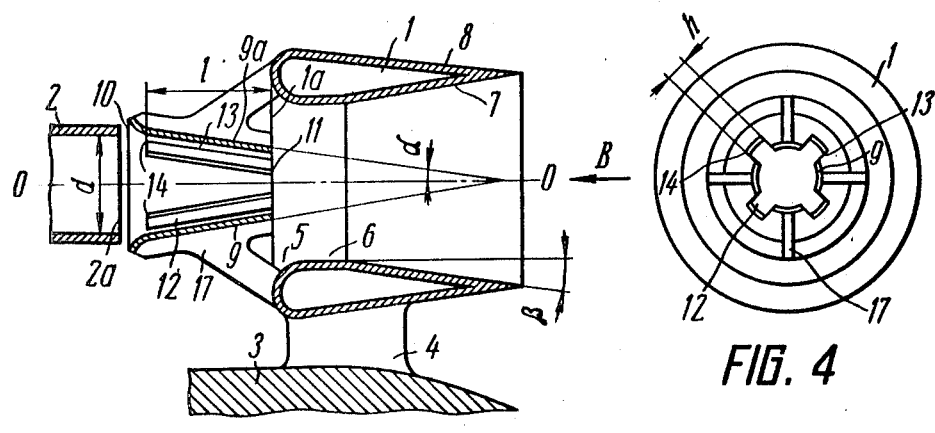
FIG. 3
FIG. 4

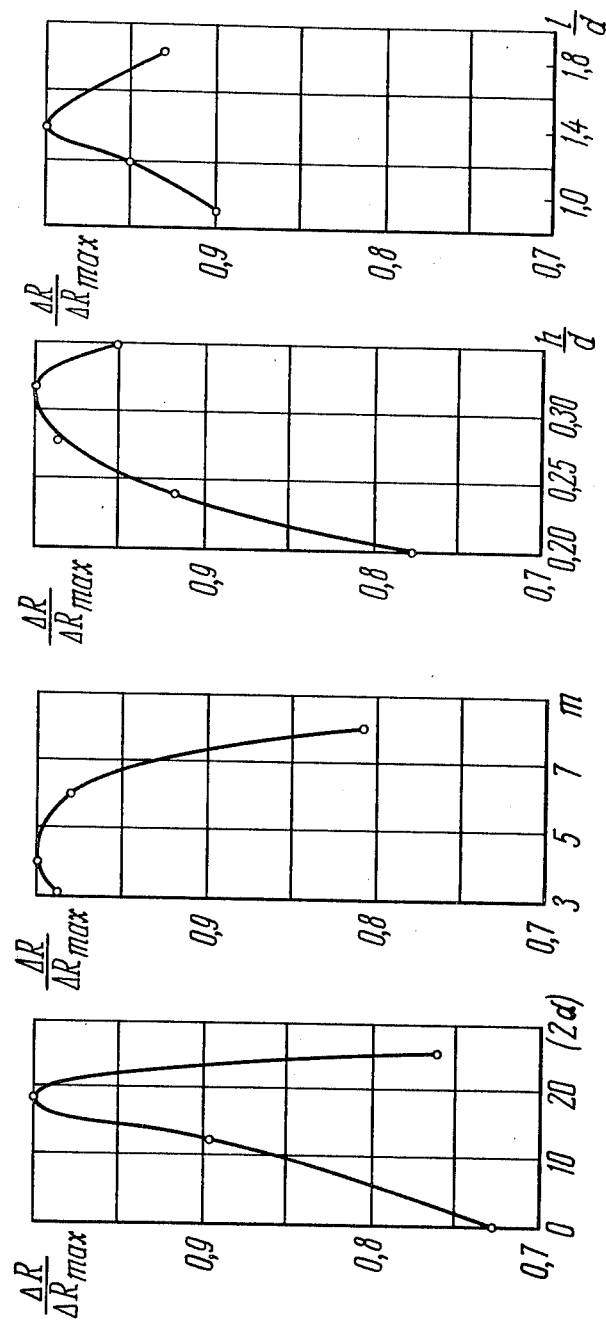

EJECTOR-TYPE ENGINE THRUST AUGMENTOR

This is a continuation of application Ser. No. 728,965, filed 10/04/76, now abandoned.

BACKGROUND OF THE INVENTION

The present invention relates to thrust augmenting devices and more particularly, to an ejector-type engine thrust augmentor.

The device according to the present invention can be used successfully for augmenting engine thrust in aircraft employed, for example, in agricultural aviation.

The invention can also be useful in the jet engines of such transport facilities as hovercraft, railway locomotives, etc.

Known in the previous art is an ejector-type engine thrust augmentor made in the form of an ejector shroud arranged along the flow after the engine nozzle having a circular cross section. The ejector shroud consists of a converging duct, a mixing chamber and a diffuser, all these units are arranged in succession along the flow, and their internal surfaces define the profiled internal surface of the ejector shroud.

The stream of gas of a round cross section discharged from the nozzle of the running engine enters the ejector shroud. The ambient air ejected by this stream enters through a converging duct into the mixing chamber and is mixed with said stream. The mixed flow passes through the diffuser and is ejected out into the atmosphere. These processes of ejection and mixing create additional engine thrust.

A disadvantage of the known ejector-type engine thrust augmentor wherein the thrust is created by ejecting ambient air by the stream of engine gases with a nozzle of a round cross section consists in an excessive length of the mixing chamber of the ejector shroud.

The need for a very long mixing chamber is caused by the insufficiently high ejecting properties of the streams of a round cross section. In case of streams with a round cross section the ejector shroud becomes effective if the length-diameter ratio of the mixing chamber is equal to 5–8.

The employment of such ejector-type thrust augmentors is hampered by their large size and weight. A reduction in the length of the mixing chamber decreases sharply the thrust increment. For example, reducing the chamber length two times causes the thrust increment to drop by more than twice.

When installing the ejector shroud on the aircraft, the dimensions of said shroud must be decreased in the first place by reducing the length of the mixing chamber which is very long in the known design.

Also known in the previous art is a small-size ejector-type thrust augmentor comprising an ejector shroud whose length is equal to one or two diameters of the mixing chamber.

However, such a thrust augmentor can render efficient operation only on the condition that the outlet section of the engine nozzle is not of a conventional round or oval shape but is, for example, star-shaped for increasing the surface of interaction between the ejecting and ejected streams.

However, the engine with a complex-shaped nozzle has but a limited field of employment. Such an engine without an ejector-type thrust augmentor cannot be used in aircraft due to heavy losses of thrust in the complex-shaped nozzle.

SUMMARY OF THE INVENTION

A main object of the present invention is to provide an ejector-type engine thrust augmentor designed to give a considerable augmentation of thrust.

Another no less important object of the present invention is to provide an ejector-type engine thrust augmentor which is small and light.

This object is accomplished by providing an ejector-type engine thrust augmentor comprising an ejector shroud arranged after the engine nozzle along the gas flow and having a profiled internal surface wherein, according to the invention, said augmentor has a shell made in the form of a truncated cone located between the engine nozzle and the ejector shroud so that the large-diameter inlet section of the shell faces the outlet section of the engine nozzle whereas the small-diameter outlet section of the shell faces the inlet section of the ejector shroud, and is provided with longitudinal slots equispaced around its perimeter.

In this design of the ejector-type engine thrust augmentor the gas stream of a round cross section discharged from the engine nozzle is transformed into a stream with a complex cross section due to the efflux of a partial amount of air from the longitudinal slots.

The stream of this complex shape has a larger surface of interaction with the ambient air as compared with the stream of a round cross section. As a result, the mass of the air ejected by the stream is increased and so is the increment of engine thrust.

It is expedient that the generatrix of the shell surface in the ejector-type engine thrust augmentor should be set at an angle of 9° to the longitudinal axis of the shell.

This ensures an optimum relationship between the area of the stream with a complex shape of cross section and the losses for friction occuring while the stream flows through the shell.

It is recommended that the area of the slots should be about 50% of the shell surface area.

This is also conductive to the provision of an optimum relationship between the area of the stream with a complex cross section and the losses for friction occuring while the stream flows through the shell.

It is advantageous if the outlet section of the shell is arranged in one and the same plane with the inlet section of the ejector shroud.

This intensifies the mixing of the stream outflowing from the shell with the air ejected from the atmosphere and, consequently, increases the thrust increment considerably.

The employment of the ejector-type thrust augmentor according to the present invention gives a considerable increase in thrust increment though the size and weight of said augmentor are considerably smaller than those of the known augmentors. For example the length of the thrust augmentor according to the invention may be equal to one quarter of the length of the known augmentor for one and the same engine.

BRIEF DESCRIPTION OF THE DRAWINGS

Now the invention will be described in detail by way of example with reference to the accompanying drawings in which:

FIG. 1 is a schematic longitudinal section through the ejector-type thrust augmentor according to the invention;

FIG. 2—same, view along arrow A in FIG. 1;

FIG. 3 is a longitudinal section through the ejector-type thrust augmentor according to the invention with the shell secured to the ejector shroud;

FIG. 4—same, view along arrow B in FIG. 3;

FIG. 5 is the curve showing the dependence of $\Delta R/\Delta R_{max}$ on $2\alpha$ where $\alpha$=inclination angle of shell generatrix to its longitudinal axis, $\Delta R$=thrust increment for various inclination angles $\alpha$; $\Delta R_{max}$=maximum thrust increment at an inclination angle $\alpha$ of 9°20';

FIG. 6 is the curve showing the dependence of $\Delta R/\Delta R_{max}$ on "m" where "m"=number of slots, $\Delta R$=thrust increment at various numbers of slots, $\Delta R_{max}$=maximum thrust increment with the number of slots equal to 4;

FIG. 7 is the curve showing the dependence of $\Delta R/\Delta R_{max}$ on h/d where h=slot width, d=diameter of nozzle outlet section, $\Delta R$=thrust increment at various values of h/d, $\Delta R_{max}$=maximum thrust increment at an optimum value of h/d=0.32;

FIG. 8 is the curve showing the dependence of $\Delta R/\Delta R_{max}$ on l/d where l=slot length, d=diameter of nozzle outlet section, $\Delta R$=thrust increment at various values of l/d, $\Delta R_{max}$=thrust increment at an optimum value of l/d;

DESCRIPTION OF THE PREFERRED EMBODIMENTS

Figure 10:
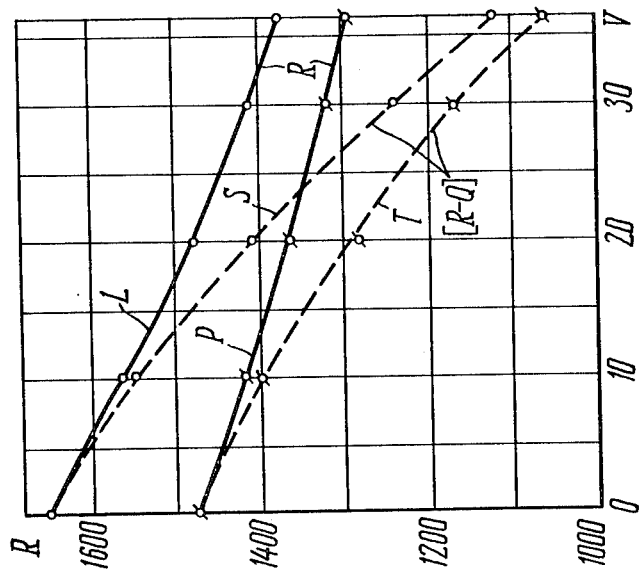
FIG. 10 shows the curves representing the dependence of engine thrust R and its excess thrust R−Q (where Q=aircraft drag) on the aircraft flying speed v with an ejector-type thrust augmentor according to the present invention, and without such augmentor.

The ejector-type engine thrust augmentor according to the present invention comprises an ejector shroud 1 (FIG. 1) mounted along the flow after the nozzle 2 of a jet engine (not shown in the drawing) with the nozzle of a round cross section.

The ejector shroud 1 is arranged on one end of the same axis 0—0 with the nozzle 2 and is secured to the fuselage 3 of the aircraft by means of pylons 4.

The ejector shroud 1 is made in the form of a body of revolution with a profiled internal surface 10 formed by a converging duct 5, i.e. a part of the shroud contracting along the flow, a cylindrical mixing chamber 6 and a diffuser 7, i.e. a part of the shroud flaring out along the flow at an angle $\beta$=3°. The converging duct 5, the mixing chamber 6 and the diffuser 7 are arranged in succession along the flow.

The external surface 8 of the ejector shroud 1 is tapered.

The ejector-type thrust augmentor also contains a shell 9 (FIGS. 1 and 2) arranged on the axis 0—0 between the engine nozzle 2 and the ejector shroud 1.

The inlet section 10 (FIG. 1) of the shell 9 faces the outlet section 2a of the nozzle 2 whereas the outlet section 11 of the shell 9 faces the inlet section 1a of the ejector shroud 1.

The shell 9 is provided with longitudinal slots 12 spaced at equal distances from one another. In the embodiment of the invention described herein the shell has four slots with longitudinal parallel edges 13. The front edges 14 of the slots 12 are located at a certain distance from the inlet section 10 of the shell 9. At the side of the outlet section 11 of the shell 9 the slots are open.

In other embodiments of the invention the shell may have a different number of slots 12, for example from three to six.

To promote stiffness of the shell 9 its external surface is provided with ribs 15 equispaced between the slots 12. The shell 9 is secured to the nozzle 2 by means of a profiled fastening element 16.

Owing to the provision of the slots 12 the stream flowing out of the nozzle 2 through the shell 9 acquires a complex shape. This improves the ejecting capacity of the steam and, accordingly, increases the thrust increment.

The generatrix 9a of the shell surface constitutes an angle $\alpha$ of 9°20' with the longitudinal axis 0—0. In other embodiments of the invention this angle may vary from 8° to 11°.

Shown in FIGS. 3 and 4 is an ejector-type thrust augmentor whose design is similar to that described above but whose shell 9 is secured directly to the ejector shroud 1 by means of ribs 17.

FIG. 5 shows the curve which represents the dependence of the relation $\Delta R/\Delta R_{max}$ on the value of angle $2\Delta$, where $\Delta R$=thrust increment at different angles $2\Delta$ while $\Delta R_{max}$=thrust increment at an optimum value of the angle $2\Delta$ equal to 18°40' and laid off along the X-axis. This dependence is constructed for the ejector-type thrust augmentor with a shell which has the number m of slots 12 equal to 4 and the relations h/d=0.24; l/d=0.92 where h=width of slot, l=length of slot, d=diameter of outlet section 2a of the engine nozzle 2. The curve shows that the maximum relation $\Delta R/\Delta R_{max}$ which is equal to a unity is obtained when the angle $2\alpha$ is equal to 18°40'.

FIG. 6 shows a curve representing the dependence of the relation $\Delta R/\Delta R_{max}$ on "m" where $\Delta R$=thrust increment at various numbers of the slots 12 while $\Delta R_{max}$=thrust increment at an optimum value of the number "m" of the slots 12 which is equal to 4 and is laid off on the X-axis. The curve is constructed at $2\alpha$=18°40', h/d=0.24, l/d=0.92. The curve shows that the relation $\Delta R/\Delta R_{max}$ acquires the greatest value (equal to unity) when the number of slots m=4.

The area of the slots 12 of the shell 9 is about 50% of its surface area.

FIG. 7 represents the curve showing the dependence of the relation $\Delta R/\Delta R_{max}$ on the relation h/d laid off along the X-axis where $\Delta R$=thrust increment at various values of the relation h/d, $\Delta R_{max}$=thrust increment at an optimum value of the relation h/d=0.32 where, as in the preceding cases, h=width of slot, d=diameter of the outlet section 2a of the nozzle 2.

With this number of slots 12 (m=4), the angle $2\alpha$=18°40'=0.92 where l=length of slot.

FIG. 8 represents the curve showing the dependence of the relation $\Delta R/\Delta R_{max}$ on the relation l/d when $2\alpha$=18°40', "m"=4, h/d=0.32, $\Delta R$=thrust increment at different values of the relation l/d, $\Delta R_{max}$=thrust increment at an optpimum value of the relation l/d.

The curves in FIGS. 7 and 8 show that there are optimum values of l=length and h=width of the slots 12 whose area is 50% of the surface area of the shell 9.

In the embodiment of the invention described herein the outlet section 11 of the shell 9 is located in one and the same plane with the inlet section 1a of the ejector shroud 1.

The ejector-type engine thrust augmentor operates as follows.

The stream of a circular cross section flows out of the outlet section 2a of the nozzle 2 of the running engine and enters the shell 9. Due to its tapered shape and the provision of slots 1,2, the shell 9 transforms the stream of a circular cross section into a stream with a complex shape of a cross section. This increases the surface area of the stream flowing out of the shell 9.

The stream with an enlarged surface ejects a larger amount of air from the ambient space.

The air entrained by the stream enters the converging duct 5 of the ejector shroud 1 and is accelerated. The entrained air starts mixing in the chamber 6 with the stream and this mixing continues in the diffuser 7. The flux entering the diffuser 7 is decelerated and thrown out into the ambient space.

Mixing of the ejected air with the stream flowing out of the shell 9 creates an additional thrust whose value is proportional to the added mass of the air.

An experimental ejector-type thrust augmentor was installed on an agricultural aircraft powered by an AI/I-25 engine.

Figure 9:
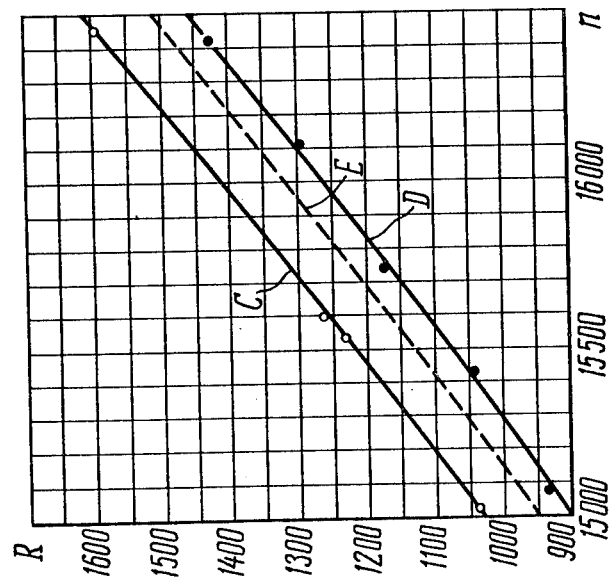
FIG. 9 is the curve showing the dependence of engine thrust R on its speed n without the thrust augmentor, with an ejector-type thrust augmentor of a known design and with an ejector-type thrust augmentor according to the present invention.

FIG. 9 represents experimental curves which show the dependence of the thrust $R_{kg}$ of the type AI/I-25 engine with an ejector-type thrust augmentor (Curve C) and without it (Curve D) on the speed "n" of the rotor of the H.P. compressor. The curves prove that the thrust of the engine with an ejector thrust augmentor is considerably higher (approximately by 11%). The dependence for the engine thrust the known ejector-type thrust augmentor without the tapered shell is represented in FIG. 9 by curve E. FIG. 9 shows that the use of a tapered shell increases considerably the thrust increment.

The ejector-type thrust augmentor can augment engine thrust at takeoff ratings of the agricultural airplane powered by a turbojet engine AI/I-25.

The results of the wind-tunnel tests of the aircraft with the running AI/I-25 engine both with and without an ejector-type thrust augmentor are shown in FIG. 10 in the form of the curves which show the dependence of thrust $R_{kg}$ on the flying speed v, m/s for the takeoff engine ratings.

The curve L in FIG. 10 corresponds to the flight with an ejector-type thrust augmentor while the curve P (FIG. 10) represents the flight without such an augmentor. The dotted lines in the same FIG. 10 show the dependence on the flying speed v, m/s of the expression $R-Q$ which is the difference between thrust R, kg and the summary aerodynamic drag Q of the airplane with an ejector-type thrust augmentor according to the invention (curve S) and without it (curve T).

The dependences represented in FIG. 10 show that thrust R kg and excess thrust $R-Q$ of the airplane with an ejector-type thrust augmentor grow considerably. This makes it possible to reduce considerably the length of the takeoff run.

It should be understood that those skilled in the art may introduce various modifications and changes into the design of the device within the spirit and the scope of the invention which has been described only as a nonconfining example.

An experimental ejector-type thrust augmentor according to the invention has been subjected to all-round tests whose results have confirmed a sufficiently high efficiency of its operation.

The total length of the thrust augmentor for the AI/I-25 engine is approximately five diameters of the nozzle outlet section whereas the total length of the known thrust augmentor is approximately 17.5 diameters of the nozzle outlet section.

We claim:

1. An ejector-type engine thrust augmentor comprising, an ejector shroud having a profiled internal surface disposed in use in a jet flow of a jet engine nozzle, a shell having a truncated cone configuration mounted coaxial with said nozzle axially spaced therefrom between the jet engine nozzle and from said shroud, the shell having a larger-diameter inlet section facing the outlet of the jet engine nozzle and axially spaced therefrom, the shell having a smaller-diameter outlet section facing an inlet section of said ejector shroud, said smaller-diameter outlet section having an outlet diameter substantially smaller than an inner diameter of said inlet section of said shroud, and said shell having four longitudinal slots along the outlet section thereof equally sectioned and spaced a circumferential direction and extending along substantially the entire length of said outlet terminating at the end of said oulet section.

2. An ejector-type engine thrust augmentor according to claim 1, in which the genetrix of said shell defines an angle of 9° with respect to the longitudinal axis of said shell.

3. An ejector-type engine thrust augmentor according to claim 1, in which said slots are no more than four and in which the area of the slots equals about 50% of the surface of said shell.

4. An ejector-type engine thrust augmentor according to claim 1, in which the end of the outlet section of said shell is a plane corresponding to a plane common to the end of the inlet section of said ejector shroud.

5. An ejector-type engine thrust augmentor according to claim 1, in which the overall axial length of the shell and shroud is approximately equal to five diameters of the jet engine nozzle outlet.

* * * * *